US012278904B2

(12) United States Patent
Joseph

(10) Patent No.: US 12,278,904 B2
(45) Date of Patent: Apr. 15, 2025

(54) SYSTEM AND METHOD FOR HIERARCHICAL TOKEN DISTRIBUTION ON BLOCKCHAIN NETWORK

(71) Applicant: nChain Licensing AG, Zug (CH)

(72) Inventor: Daniel Joseph, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/380,077

(22) Filed: Oct. 13, 2023

(65) Prior Publication Data

US 2024/0089106 A1   Mar. 14, 2024

Related U.S. Application Data

(63) Continuation of application No. 17/555,326, filed on Dec. 17, 2021, now Pat. No. 11,838,420, which is a
(Continued)

(30) Foreign Application Priority Data

Jun. 28, 2017 (GB) ..................... 1710283

(51) Int. Cl.
*H04L 29/06* (2006.01)
*H04L 9/08* (2006.01)
(Continued)

(52) U.S. Cl.
CPC ............ *H04L 9/3213* (2013.01); *H04L 9/085* (2013.01); *H04L 9/088* (2013.01); *H04L 9/3215* (2013.01); *H04L 9/50* (2022.05)

(58) Field of Classification Search
CPC ....... H04L 9/3213; H04L 9/085; H04L 9/088; H04L 9/3215; H04L 9/50; H04L 9/3239;
(Continued)

(56) References Cited

U.S. PATENT DOCUMENTS 7,565,537 B2 *   7/2009 Morais ................. H04L 9/3297
                                                      713/181
2015/0242894 A1*  8/2015 Gopal ................ G06Q 30/0256
                                                      705/14.54
(Continued)

FOREIGN PATENT DOCUMENTS

WO      2016170538 A1    10/2016
WO      2017122187 A2     7/2017

OTHER PUBLICATIONS

Nandakumar et al., "Secure one-time biometric tokens for non-repudiable multi-party transactions", 2017 IEEE Workshop on Information Forensics and Security (WIFS), Date of Conference: 04-07, Dec. 2017.*
(Continued)

*Primary Examiner* — Morshed Mehedi
(74) *Attorney, Agent, or Firm* — Tarolli, Sundheim, Covell & Tummino LLP

(57) ABSTRACT

A computer-implemented method to generate a unidirectional commitment channel to send one or more tokens from a sender node to a recipient node using a blockchain is disclosed. The method is implemented by a processing resource that performs steps comprising: generating a first commitment transaction representing a commitment component in which a specified set of tokens is sent or committed for transfer from the first node to the second node; generating a return transaction which returns all tokens from the second node to the first node; signing the return transaction and, based on the signing of the return transaction, signing the commitment transaction; creating one or more further return transactions to reflect the transfer of tokens being made off the blockchain.

12 Claims, 9 Drawing Sheets

Related U.S. Application Data continuation of application No. 16/626,298, filed as application No. PCT/IB2018/054629 on Jun. 22, 2018, now Pat. No. 11,240,032.

(51) Int. Cl.
*H04L 9/32* (2006.01)
*H04L 9/00* (2022.01)

(58) Field of Classification Search
CPC . H04L 2209/56; H04L 9/3297; H04L 9/0822; H04L 9/3247
See application file for complete search history.

(56) References Cited

U.S. PATENT DOCUMENTS

| | | | | |
|---|---|---|---|---|
| 2016/0103675 | A1* | 4/2016 | Aabye | G06F 9/4451 717/170 |
| 2019/0361917 | A1* | 11/2019 | Tran | H04W 12/108 |
| 2020/0193009 | A1* | 6/2020 | Shafet | G06F 16/332 |

OTHER PUBLICATIONS

Aitzhan et al., "Security and Privacy in Decentralized Energy Trading through Multi-signatures, Blockchain and Anonymous Messaging Streams," IEEE Transactions on Dependable and Secure Computing 15(5):840-52, Jan. 1, 2016.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Barber et al., "Bitter to Better—How to Make Bitcoin a Better Currency," International Conference on Financial Cryptography and Data Security, Feb. 27, 2012, http://elaineshi.com/docs/bitcoin.pdf, 15 pages.
Bissias et al., "Sybil-Resistant Mixing for Bitcoin," Proceedings of the 13th Workshop on Privacy in the Electronic Society, Nov. 3, 2014, http://forensics.umass.edu/pubs/bissias.wpes.2014.pdf, 10 pages.
Coutu, Oliver, "Privacy in Bitcoin Through Decentralized Mixers", 2014, University of Montreal, 118 pages.
Decker et al., "A Fast and Scalable Payment Network with Bitcoin Duplex Micropayment Channels," Symposium on Self-Stabilizing Systems, Aug. 18, 2015, 16 pages.
Ibrahim, "SecureCoin: A Robust Secure and Efficient Protocol for Anonymous Bitcoin Ecosystem," International Journal of Network Security 19(2):295-312, Mar. 2017, http://ijns.jalaxy.com.tw/contents/ijns-v19-n2/ijns-2017-v19-n2-p295-312.pdf.
International Search Report and Written Opinion mailed Oct. 16, 2018, Patent Application No. PCT/IB2018/054629, 11 pages.
Malavolta et al., "Concurrency and Privacy with Payment-Channel Networks," 2017 ACM SIGSAC Conference, Oct. 2017, 27 pages.
Maxwell et al., "CoinSwap: Transaction graph disjoint trustless trading," Bitcoin Forum, Oct. 30, 2013, https://bitcointalk.org/index.php?topic=321228.0;all, 21 pages.
Nakamoto, "Bitcoin: A Peer-to-Peer Electronic Cash System," Bitcoin, Oct. 31, 2008, https://bitcoin.org/bitcoin.pdf, 9 pages.
Russell, "Lightning Networks Part II: Hashed Timelock Contracts (HTLCs)," Rusty Russell's Coding Blog, Apr. 1, 2015, https://rusty.ozlabs.org/?p=462, 7 pages.
Russell, "Reaching the Ground With Lightning (draft 0.2)," Github, Nov. 20, 2015, https://github.com/ElementsProject/lightning/blob/master/doc/deployable-lightning.pdf, 19 pages.
Satoshi et al., "Connection Limits," Bitcoin Forum, Aug. 9, 2010, https://bitcointalk.org/index.php?topic=741.0;prev_next=prev, 2 pages.
Saxena, et al., "Increasing Anonymity in Bitcoin" Financial Cryptography and Data Security Workshop, vol. 8438, Mar. 2014, 19 pages.
Schie, "Routing Scalable Bitcoin Payments," Swiss Federal Institute of Technology Zurich Bachelor Thesis, Sep. 18, 2015, https://pub.tik.ee.ethz.ch/students/2015-FS/BA-2015-12.pdf, 19 pages.
Tschorsch et al., "Bitcoin and beyond: A technical survey on decentralized digital currencies," IEEE Communications Surveys and Tutorials 18(3):2084-123, Mar. 2, 2016.
UK IPO Search Report mailed Dec. 6, 2017, Patent Application No. GB1710283.1, 6 pages.
Wijaya et al., "Anonymizing Bitcoin Transaction" Medical Image Computing and Computer-Assisted Intervention—Miccai 2015, Nov. 5, 2016, pp. 276-279.
Wijaya, "Extending asset management system functionality in bitcoin platform", 2016 International Conference on Computer, Control, Informatics and its Applications (IC3INA), Oct. 3, 2016, 5 pages.
UK Commercial Search Report mailed Nov. 8, 2017, Patent Application No. GB511046, 7 pages.

* cited by examiner

SYSTEM AND METHOD FOR HIERARCHICAL TOKEN DISTRIBUTION ON BLOCKCHAIN NETWORK

CROSS-REFERENCE TO RELATED APPLICATIONS

This application is a continuation of U.S. patent application Ser. No. 17/555,326, filed Dec. 17, 2021, entitled "SYSTEM AND METHOD FOR HIERARCHICAL TOKEN DISTRIBUTION ON BLOCKCHAIN NETWORK," which is a continuation of U.S. patent application Ser. No. 16/626,298, filed Dec. 23, 2019, now U.S. Pat. No. 11,240,032, entitled "SYSTEM AND METHOD FOR HIERARCHICAL TOKEN DISTRIBUTION ON BLOCKCHAIN NETWORK," which is a 371 National Stage International Patent Application No. PCT/IB2018/054629, filed Jun. 22, 2018, which claims priority to United Kingdom Patent Application No. 1710283.1, filed Jun. 28, 2017, the disclosures of which are hereby incorporated herein in their entirety.

BACKGROUND

This invention relates generally to transfers and transactions conducted via a blockchain and, more particularly, to methods and devices for providing cryptographic security in a token-mixing system to allow a plurality of input nodes to collaboratively distribute tokens to a plurality of output nodes.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e., added to the public ledger of past transactions.

Another area of blockchain-related interest is the use of 'tokens' (or 'colored coins') to represent and transfer real-world entities via the blockchain. A potentially sensitive or secret item can be represented by the token which has no discernible meaning or value. The token thus serves as an identifier that allows the real-world item to be referenced from the blockchain. Tokens may, for example, represent future control of network resources and/or digital assets. In some cases, tokens may represent an asset or value. The present application is not limited to implementations in the context of cryptocurrency and is more broadly understood as relating to blockchain networks for distributed transfer of tokens.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, using secondary data (e.g. a shipping address required to complete a transaction) and analytics, interested third parties may be able to combine publicly available information to associate transactional details on the Bitcoin ledger to a real identity. In certain systems e.g. voting systems, medical applications etc., traceability of users within or from a network can be undesirable for a number of reasons such as security and/or confidentiality.

One way in which a user may be identified through blockchain data is the amount of blockchain tokens controlled by a specific Bitcoin address. By tracing the flow of tokens in transactions that are broadcast over the Bitcoin network, it may be possible to attribute a certain amount of tokens to an address. This token amount may, in turn, be used (for example, by an external third party) to deduce the identity of a user associated with the address. For example, if the total number of tokens transferred from an address is determined to be conspicuously large, the set of possible identities for the user associated with that address may be reduced to include only those that are known to hold or be capable of holding such a large token amount.

The difficulty in safeguarding a user's identity is especially more prominent in cases where the tokens at an address are kept "intact" (i.e. maintained as a unitary amount) rather than split up into multiple sub-amounts/quantities before actual transfers of tokens are made from the address. Even when various anonymizing techniques are employed to try to disguise the transfer of tokens from an address, transactions that originate from the address will be more easily tracked if the tokens to be transferred via the transactions are kept intact. Splitting up a token amount at an address is not, however, a straightforward task and poses technical challenges. In particular, the task of dividing an initial amount of tokens at an address into smaller sub-amounts poses the technical challenge of disassociating the user from the initial amount while still maintaining ownership i.e. control of the tokens.

Thus, it is desirable to provide methods and devices for dividing and distributing token amounts at blockchain addresses to facilitate enhanced untraceability and unlinkability of inputs to outputs in blockchain transactions.

However, numerous technical problems exist when attempting to securely mix and distribute tokens within a blockchain network. For example, security may be compromised if a participant node is able to claim tokens before that participant node (or another node associated with that participant node) has executed a protocol which allows other tokens to be released to other nodes. Further, it is important to guard against intentional or accidental misallocation of tokens, for example, due to an offline participant.

Such a solution has now been devised.

BRIEF SUMMARY

Thus, in accordance with the present invention there are provided methods and devices as defined in the appended claims.

The invention may provide a computer-implemented method and corresponding system. The method/system may be described as a blockchain-implemented method/system. The invention may be described as a security method or cryptographic method/system. It may provide for the secure transfer of a digital resource/asset (e.g., a token) such as a portion or quantity of cryptocurrency. Additionally or alternatively, it may provide a control mechanism for controlling the transfer of a digital asset/resource such as a portion or quantity of cryptocurrency. For ease of reference, the asset or resource may be referred to herein as a "token."

"Commitment channels" may be constructed in an ordered fashion and a plurality of nodes may be arranged in a hierarchical manner. A root node may control the execution of token transfers or exchanges (e.g., distributions of tokens to particular nodes) within the hierarchy. The methods and systems described herein may improve the security of token distribution by ensuring that no unlocking/access of any tokens involved in the distribution may be made by any participant node until and unless the controller node has determined that commitment channels have been appropriately created and the controller node has then initiated the token transfer process. The controller node may initiate the sequential reveal of secret values which, when combined with the hierarchical arrangement of commitment channels, may ensure that participating nodes receive an expected distribution of tokens. For example, a sequential reveal of secret values along each path of the hierarchy may allow participating nodes to receive tokens from the respective node along the path that is transferring such tokens. Sequential secret revealing may allow participating nodes to receive their respective tokens only when all token transactions have been signed by participating nodes and commitment channels have been created and completed appropriately as determined by the controller node.

Additionally or alternatively, the present application may describe a computer-implemented method to participate in a resource (or "asset" or "token") distribution process for dividing a quantity of resources/assets/tokens at an input address associated with an input node into a plurality of sub-quantities and distributing the sub-quantities to multiple output addresses associated with respective output nodes using a blockchain. Hereafter, we use the term "token" instead of "resource" or "asset" for convenience.

The token distribution process may be implemented collectively by the input node, the output nodes, and a plurality of mixer nodes. The method may be implemented at a mixer node. It, may include:
  identifying an upstream node and a plurality of downstream nodes associated with the mixer node; collaborating with the upstream node to generate a first commitment channel for a first (blockchain) transaction between the upstream node and the mixer node; and for each of the plurality of downstream nodes:
    collaborating with the downstream node to generate a second commitment channel for a second transaction between the mixer node and the downstream node such that an unlocking script for the first (blockchain) transaction is derived from an unlocking script for any one of the second (blockchain) transactions.

The term "transferor node" may be used herein interchangeably with the term "upstream node." The transferor node may be a node which transfers a resource to another node. The term "downstream node" may be used herein interchangeably with the term "transferee node." The transferee node may be a node which receives a resource from another node e.g. a transferor node.

In some implementations, generating the second commitment channel may include collaborating with the downstream node to: generate a first blockchain transaction for committing a quantity of tokens to transfer to the downstream node; generate a second blockchain transaction that returns the committed quantity of tokens to the mixer node; and generate a third blockchain transaction for executing transfer of the committed quantity of tokens to the downstream node.

In some implementations, the quantity of tokens may be determined based on a value allocation scheme for the mixer node which identifies a respective quantity to transfer to each of the plurality of downstream nodes.

In some implementations, the third blockchain transaction may include an unlocking script containing a second secret value associated with the second commitment channel.

In some implementations, the method may further involve obtaining the second secret value associated with the second commitment channel.

In some implementations, the method may further involve deriving a first secret value associated with the first commitment channel using the second secret value.

In some implementations, the first secret value is based on a secret key value associated with the input node, the secret key value being unknown to all mixer nodes.

In some implementations, the method may further involve transmitting a mixer key value to the upstream node and to the input node.

In some implementations, the mixer node may include a first address at which the mixer node detects transfer of a first quantity of tokens from the upstream node and a plurality of second addresses from which the mixer node transfers sub-quantities of the first quantity to the downstream nodes.

In some implementations, a total quantity of tokens at the plurality of second addresses may be at least equal to the first quantity.

In some implementations, the second blockchain transaction may include a transaction parameter specifying a point in time after which the second blockchain transaction becomes eligible for submission to the blockchain.

In some implementations, the first blockchain transaction may be submitted to the blockchain after the second blockchain transaction is signed by the downstream node.

In some implementations, the first commitment channel may be generated before any second commitment channel is generated.

The present application further describes computing devices for performing the described methods, where the computing devices may include at least one processor, memory, a networkinterface to provide network connectivity, and a blockchain application containing processor-executable instructions that, when executed, cause the processor to carry out the operations of one or more of the methods described herein.

The present application further describes non-transitory processor-readable medium which may store processor-executable instructions to participate in a token distribution process including an input node, multiple output nodes, and a plurality of mixer nodes, wherein the processor-executable instructions, when executed by a processor in one of the nodes, cause the processor to carry out the operations of one or more of the methods described herein. The processor may be provided in a mixer node.

BRIEF DESCRIPTION OF THE DRAWINGS

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
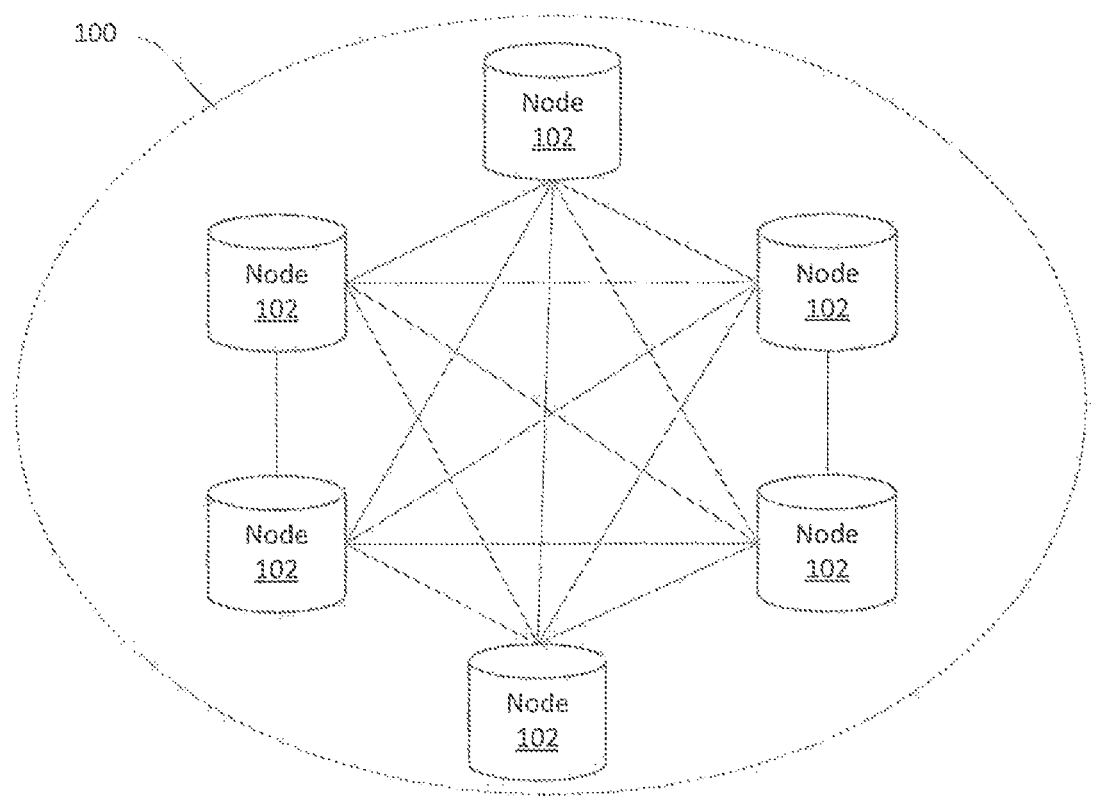
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which tokens are transferred as a result of the transaction. Those tokens are then associated with that output address as an available transaction output. In the context of a cryptocurrency, like Bitcoin, an available transaction output may be referred to as an unspent transaction output (UTXO). A subsequent transaction may then reference that address as an input in order to transfer those tokens to one or more other addresses.

While the transactions are pseudo-anonymous in that no personal information is contained in the transactions on the blockchain ledger, it is possible to trace the transfer of tokens in chains of transactions and, in some cases, to link tokens to an individual using external data. In order to increase anonymity, a mixing transaction may be used to pool inputs from a variety of sources and then to divide and allocate the pooled tokens to outputs. If all the inputs and outputs are the same size, it is difficult to associate a particular input with a particular output. However, in such transactions at least one participating node is aware of the linkage between an input address and output address specified by another participating node. In such mixing transactions, such as a CoinJoin operation in the Bitcoin protocol, a single transaction having multiple inputs and multiple outputs is used to mix the tokens.

Some other anonymizing techniques are used to try to avoid revealing links between an input and an output, such as ring signatures or stealth addresses, with varied effectiveness. Stealth addresses try to de-link the output address to which tokens are sent from a particular user. Ring signatures try to make a source untraceable by making it equally probable that any one of a group of possible signatories was the one that signed/authorized a particular transaction. Unfortunately, ring signatures have proven to be problematic to implement in some blockchain protocols.

The present disclosure provides techniques for distributing tokens at a blockchain address to multiple different addresses. More specifically, techniques are described for dividing an initial token amount at an address into smaller sub-amounts and distributing the sub-amounts across a set of output addresses. The division of tokens is accomplished with a view to de-linking control/ownership of the initial token amount from the control/ownership of the sub-amounts at their final addresses. In particular, the sub-amounts of the initial tokens are distributed so as to make it difficult for an external observer to associate the final output addresses with the address that housed the initial token amount.

In accordance with embodiments of the present invention, initial tokens at an address on a blockchain are distributed through a hierarchical structure of transfers of tokens between a set of participating nodes. In particular, an initial token amount and its sub-amounts are sequentially divided through multiple layers of a "hierarchy." The term "hierarchy," as used in the present disclosure, refers to a structure for conceptualizing a set of transfers that are made in order to distribute sub-amounts of an initial token amount at an address. In the present context, a "hierarchy" may be understood as a tree structure that includes a root node and subtrees of children with a parent node, represented as a set of linked nodes. The hierarchical token distribution scheme proposed in the present disclosure uses transfers of tokens between participating nodes (represented as nodes in a tree structure) to distribute tokens from a "root" node, corresponding to an initiator of the distribution, to multiple "leaf" nodes, which are output addresses also controlled by the initiator.

The techniques described herein also provide a security mechanism, implemented via the use of "commitment channels" for transferring tokens between participating nodes, to ensure that participating nodes in the distribution are not at risk of having their tokens stolen. The initiator of the protocol controls a sequential "unlocking" of commitment channels, using propagated revealing of secret values associated with the commitment channels, to prevent the token transactions of the protocol from being executed until all commitment channels for those transactions have been established. Upon successful completion of all of the token transactions using the created commitment channels, an initial token amount of an address is distributed to multiple destination (output) addresses.

In the description herein, the terms "input node," "output node," "participating node," "input address," and "output address" may be used. The reference to an "address" of a node is not meant to refer to a network address of a physical node. Instead the "address" is an address specified in a transaction on the blockchain having an allocation of tokens to which the physical node can claim ownership by having a key that corresponds to a signature on the transaction. In this sense, the "output address" is not an address of the participating node, but is a blockchain transaction output address that is owned by or associated with the participating output node. Likewise, the "input address" is an address of an available transaction output (in cryptocurrency terms, a UXTO) that is owned by or associated with the participating input node.

Commitment Channels

Various blockchain technologies, such as Bitcoin, may sometimes employ "commitment channels" in the construction of pairwise transactions between participating nodes. Commitment channels are designed to allow nodes to make multiple transactions without having all of the transactions committed to the blockchain. Once a commitment channel is established between a pair of participating nodes, the nodes can engage in as many transfers as they would like in a given time period, with only two of the transactions ultimately being added to the blockchain. As a result, the use of commitment channels can lead to a reduction in the number of transactions that are required to be added to the blockchain and a reduction in associated transaction costs. A commitment channel also offers a transferor node the flexibility of having tokens returned if specific criteria are not met by the transferee node or if either the transferor or transferee node determined to end the process after a certain set of transfers.

Figure 2:
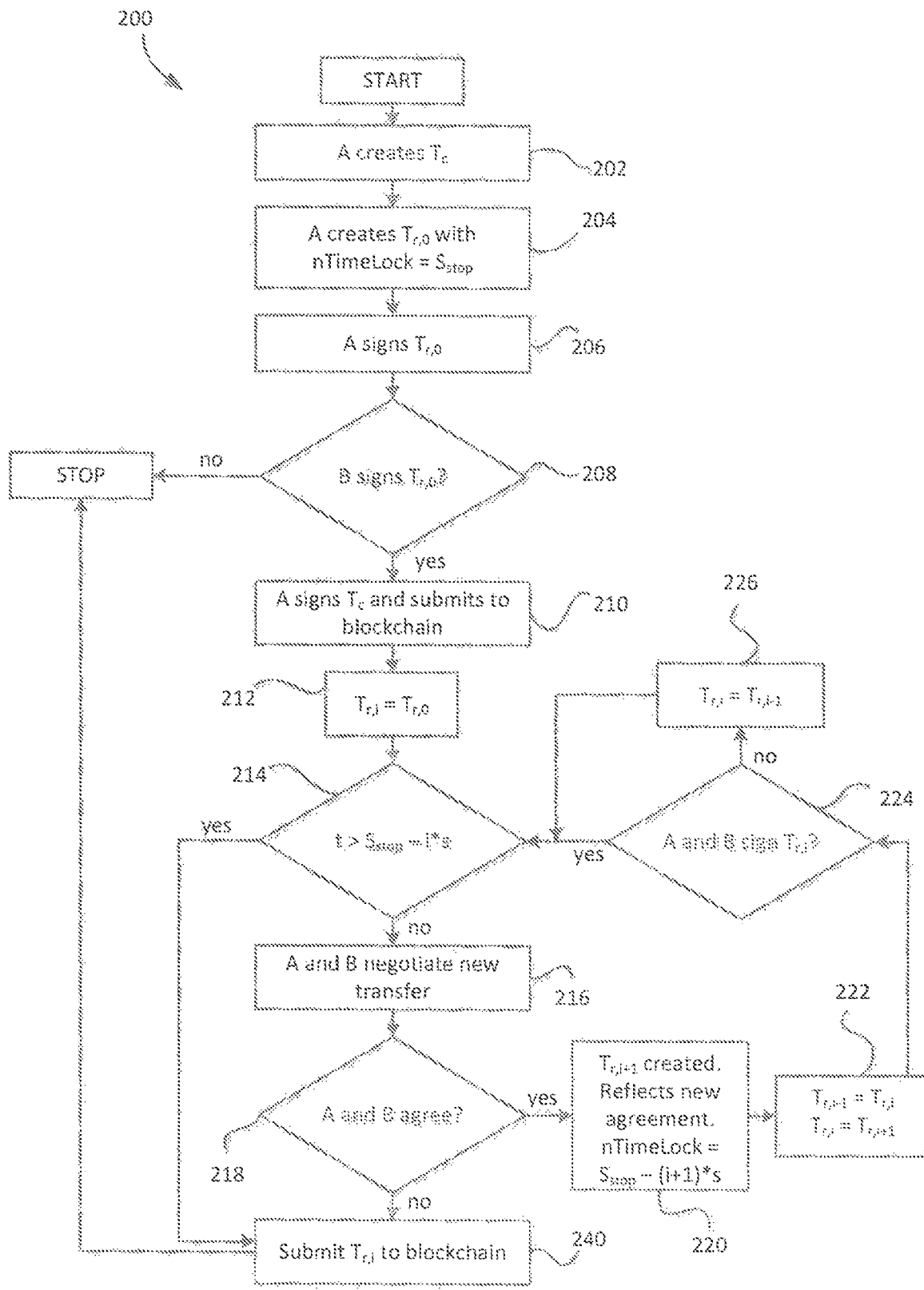
FIG. 2 shows, in flowchart form, an example process for constructing a commitment channel.

FIG. 2 shows, in flowchart form, an example process 200 for generating a unidirectional commitment channel $U_A \rightarrow U_B$ from a transferor node $U_A$ to a transferee node $U_B$. The process 200 is implemented by a pair of participating nodes $U_A$ and $U_B$. For example, a unidirectional commitment channel may be suitable for use in a scenario where a party A desires to pay a party B (e.g. for a service) via multiple transfers over a period of time. More generally, the commitment channel $U_A \rightarrow U_B$ may facilitate the possible set of exchanges of tokens between participating nodes $U_A$ and $U_B$.

In step 202, transferor $U_A$ generates a commitment transaction $T_c$. The commitment transaction represents the commitment component of the commitment channel in which a specified set of tokens, x, is sent/committed for transfer to $U_B$. The commitment transaction may, in some embodiments, be a 2-of-2 multi-signature pay-to-script-hash (P2SH) transaction. At this point, the transaction is not submitted to the blockchain network.

In step 204, a separate return transaction, $T_{r,0}$, that returns all the tokens from the multi-signature controlled tokens back to $U_A$ is generated by $U_A$. This transaction includes a parameter, nLockTime, that allows a blockchain transaction to only be executable after a specific point in time. The return transaction allows the committed tokens to be returned to node $U_A$ if the transferee node $U_B$ is unable to complete, in an allotted time (i.e. up to nLockTime) a stated criteria for the commitment transaction.

In step 206, transferor $U_A$ signs the return transaction. If it is determined, in step 208, that $U_B$ has signed the return transaction, $U_A$ signs the original commitment transaction $T_c$ and submits it to the blockchain, in step 210. At this point, the nodes $U_A$ and $U_B$ can proceed to create one or more new return transactions ($T_{r,1}$, $T_{r,2}$, ... $T_{r,i}$, ...) to reflect the token transfers being made, off-the-blockchain, as shown in steps 212 through to 226. In particular, these return transactions would reflect the net transfer of tokens that $U_A$ is required to make to $U_B$ at that point in time. If a participating node refuses to sign any return transaction, $T_{r,i}$, the node can submit the 'previous' return transaction, $T_{r,i-1}$, to the blockchain, after nLockTime. For example, in the worst case scenario, $U_A$ can reclaim all the tokens that were committed by $U_A$ in $T_c$ by signing $T_{r,0}$ and submitting it to the blockchain network.

As shown in FIG. 2, iterations of (off-block) return transactions between $U_A$ and $U_B$ may be created, until a final return transaction representing the net transfer of tokens from $U_A$ to $U_B$ is constructed and submitted to the network. More specifically, if the nLockTime value on the initial return transaction, $T_{r,0}$, is represented by $S_{stop}$, n is the number of return transactions created in the ongoing, off-block transfers made between $U_A$ and $U_B$, and s is the time allotted for both parties to agree to a return transaction before a node risks the other node submitting the previous return transaction, the nodes can continue negotiating new transfers (step 216) while $t \leq S_{stop} - i*s$, (that is, while nLockTime for the initial return transaction has not been passed) with the value of nLockTime being decremented with each successive return transaction, until a final return transaction is submitted to the blockchain, in step 240.

Hierarchical Token Distribution

The present disclosure describes techniques for distributing tokens at a specific address in a blockchain to multiple output addresses. A token amount at an initial address is divided into multiple sub-amounts, which are then distributed across a set of output addresses. The token distribution scheme proposed in the present disclosure (Hierarchical Token Distribution scheme, or "HTD") utilizes a "hierarchical" structure of transfers between participating nodes (represented as nodes in a conceptual "hierarchy"). In particular, the HTD transfers tokens from an initial address through a multi-level hierarchy of nodes. In some cases, the HTD may be used as part of or in addition to a solution for anonymizing transactions in a blockchain network. An example implementation of the HTD will now be described with reference to FIGS. 3 to 8.

Initiating the Token Distribution

Figure 4:
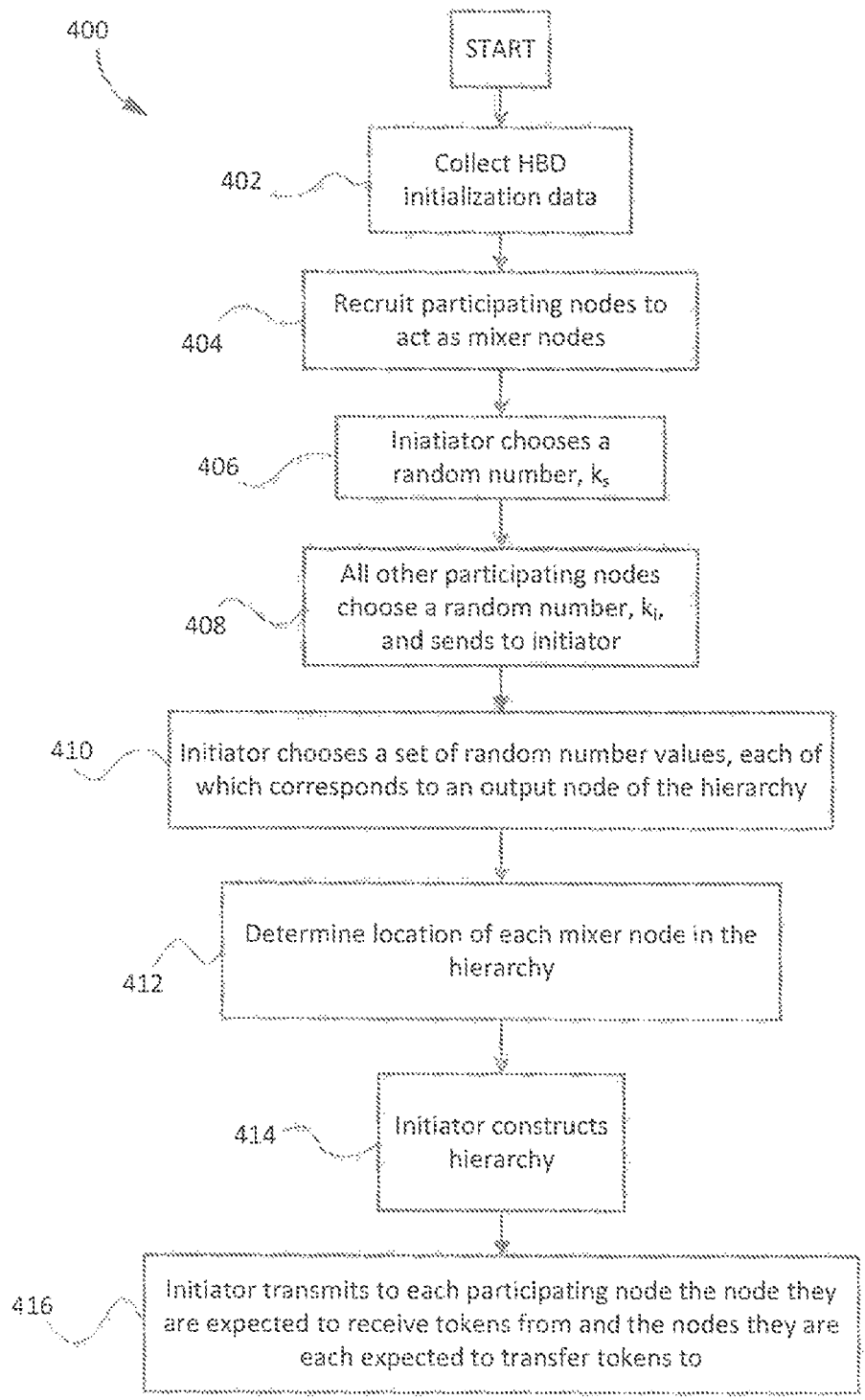
FIG. 4 shows, in flowchart form, an example process for initiating an instance of the hierarchical token distribution protocol.

Reference is made to FIG. 4, which shows an example process 400 for initiating an instance of the HTD protocol. A node can join an HTD instance to divide and distribute tokens at an address associated with the node. As described above, the HTD proceeds by conceptually arranging a plurality of nodes into a multi-level hierarchy. The initiator of the HTD is represented as the root node, $U_0$, and the output addresses of the token distribution are represented as leaf nodes in the hierarchy. An HTD instance may be administered by the initiator itself or by a different node and/or control system, in which case the initiator would request to use the HTD services provided by the node/control system.

At step 402, initialization data, including various parameters of the HTD services, may be collected or selected by the administrator and/or the initiator, including:

A fixed number of branches per node (n b) in the hierarchy, indicating the number of children/transferees that each non-leaf node in the hierarchy will have.

The number of outputs, or "leaves". In at least some embodiments, the number of outputs may be selected from the set of values in the range of the function $$\text{Leaves}=f(n_b,n_l)=n_b^{n_l-1}$$

where $n_l>2$ is the number of levels in the hierarchy, the root node is level 1, and the final level is the level containing the leaves. For example, if $n_b=2$, the range of leaves is Leaves=$\{2^2, 2^3, 2^4, \ldots 2^{n_l-1}\}$=$\{4, 8, 16, \ldots\}$ At step 404, the HTD recruits a set of participating nodes to act as "mixer nodes" in the hierarchy. The recruiting may be performed by an administrator of the HTD and/or the initiator, or it may be decentralized (e.g. participating nodes may "opt in" to the HTD to serve as mixer nodes, for example, to receive payment for providing its "mixing" services). Mixer nodes are the non-root, internal nodes in the tree structure of the hierarchy. Each mixer node is configured to receive a first quantity of tokens from its "parent" (or upstream) node and transfer sub-amounts of said first quantity to its "child" (or downstream) nodes. Given the parameters n b and $n_l$, the number of mixer nodes, $n_{mix}$, in the hierarchy of an HTD instance may be calculated by:

$$n_{mix} = \sum_{i=1}^{n_l-2} n_b^i = \frac{n_b^2 - n_b^{n_l}}{n_b - n_b^2}.$$

In some embodiments, the mixer nodes may provide a "mixing" function within the HTD. To facilitate the mixing, each recruited participating node may be expected to possess at least a minimum quantity ($min_x$) of tokens, where $min_x=f(n_l)$. This minimum may depend on the level in the hierarchy at which the mixer node is positioned.

A key component of the HTD protocol is the implementation of a security mechanism to ensure that the protocol is fully implemented without risk of partial completion and consequent failure to realize the desired final distribution of tokens. To achieve the necessary security for the HTD, the solution utilizes the homomorphic properties of the public-private key relationship of Elliptical Curve encryption, where $$E(m)+E(n)=E(m+n)$$

$E(x)=xG$ and G is the base point of the Elliptical Curve. The security of the protocol relies on the use of "commitment channels" for all token transactions between parent-child node pairs in the hierarchy of the HTD, and the control exercised by the initiator, $U_{rt}$, over the commitment channels established between participating nodes of the protocol.

In setting up this security mechanism, the initiator first chooses, at step 406, a random number (or key), $k_s$, and calculates $k_sG$, where G represents the base point on the Elliptic Curve. The value of $k_s$ is kept secret by the initiator throughout the HTD. Every other participating node, $U_i$, chooses a respective random number/key, $k_i$, and securely sends this value to the initiator, at step 408. The initiator then selects, at step 410, a set of random number values, $\{k_{rt,i}\}$, where each of these random numbers corresponds to a leaf (output) node of the hierarchy. That is, the initiator assigns a random value, $k_{leaf}$, to each leaf node.

Figure 3:
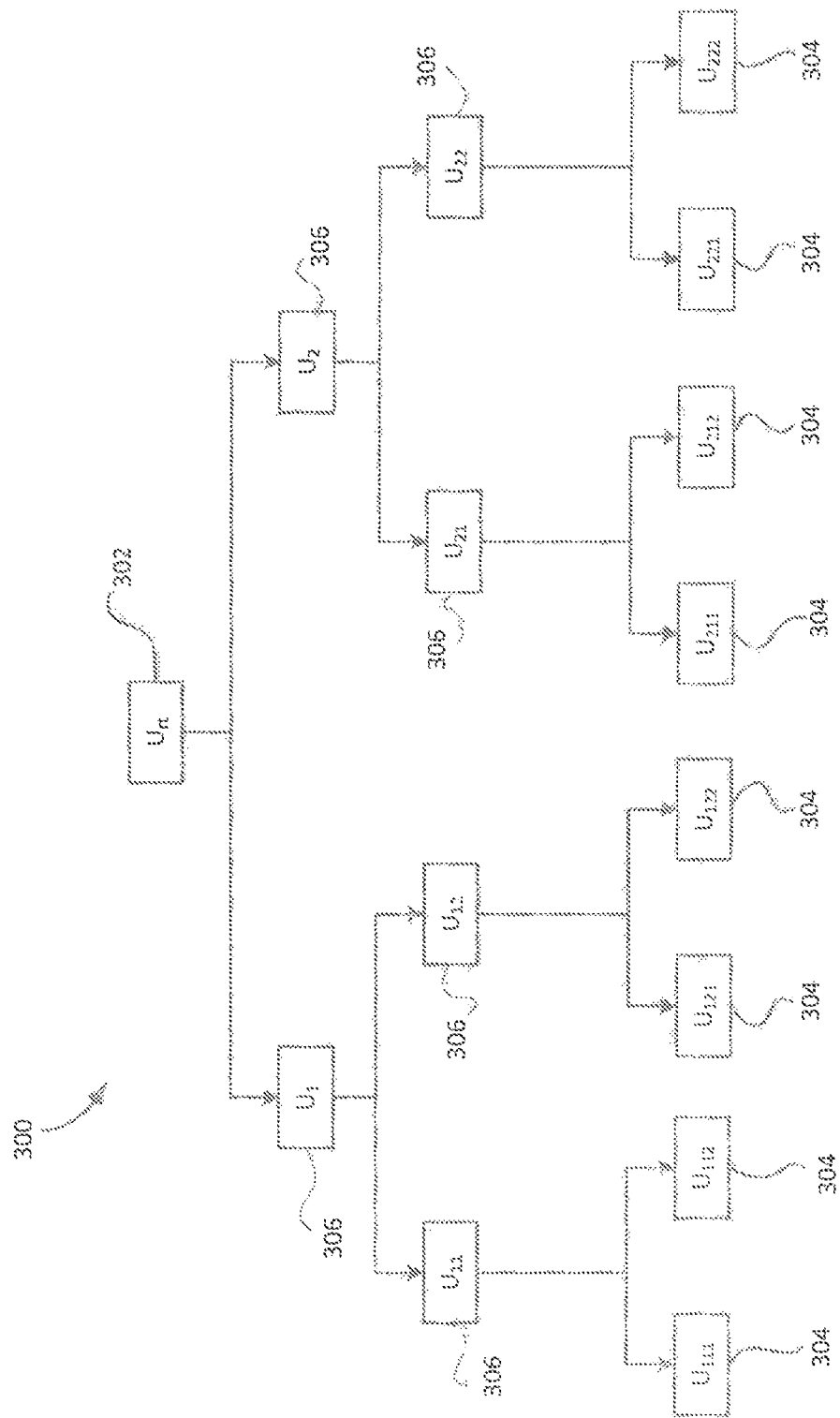
FIG. 3 shows an example hierarchy of nodes utilized in the hierarchical token distribution protocol.

When a sufficient number of mixing nodes have been recruited by the HTD service, a hierarchy of nodes is "constructed," based on the number of output values, or leaves, chosen by the initiator. An example hierarchy 300 of nodes is illustrated in FIG. 3, where $n_b=2$ and the number of levels, $n_l$, is equal to 4. The hierarchy includes a root node 302, eight leaf nodes 304, and a plurality of mixer nodes 306 located at a unique position along eight different paths between the root node 302 and leaf nodes 304. An initial quantity of tokens at an address associated with the root node 302 can be distributed to output leaf nodes 304 using a distribution scheme based on the hierarchy 300. (Without loss of generality, the following notation will be used throughout the disclosure for labelling nodes: if a node is labelled $U_{ij}$, then $U_{ij}$'s parent node is $U_i$, and a child node of $U_{ij}$ is $U_{ijk}$, where $k \in [1, n_b]$.)

The "hierarchy" of HTD is a representation of the set of token transactions between participating nodes that results in distributing an initial quantity of tokens at a specific blockchain address to multiple different output addresses. In particular, the relative positions of nodes in the hierarchy define the transactions that are used by the HTD protocol in distributing the tokens of the initial address. Each node in the hierarchy other than the root node receives a transfer of tokens from its parent node, and all non-leaf nodes in the hierarchy transfer tokens, of respective amounts, to each of its child nodes. More specifically, each mixer node in the hierarchy participates in two types of transactions, namely (1) receiving transfer of a certain quantity, x, of tokens from its parent node, and (2) transferring respective sub-amounts of x to its child nodes. Accordingly, the location of a node in the hierarchy completely defines the set of transactions in which the corresponding participating node will be involved.

To assist in the anonymizing capabilities of the HTD, various randomization processes may be undertaken during the construction of the hierarchy to determine the locations of individual mixing nodes. The randomization may be done on a level-by-level basis (i.e. the participating node is designated to a level of the hierarchy, but its position in the level is randomly determined), or the node may be placed at any random mixing node location in the hierarchy.

Due to the hierarchical arrangement of mixer nodes in the HTD, the choice of randomization would have implications for the $min_x$ quantity of tokens already available at the mixer nodes. In order for a mixer node to be able to mix transfer of tokens during the HTD, it should possess at least a minimum amount of tokens prior to receiving any tokens for distribution. For example, a restriction may be imposed during recruitment of mixer nodes requiring that at least one of the mixer nodes have an equivalent quantity of tokens as the quantity that it is asked to distribute to its child nodes already available at $n_b$ separate addresses. This would mean that, depending on the ratio in which tokens are to be split between child nodes, the higher a mixer node is in the hierarchy, the more tokens it must possess in order to participate in the HTD (since nodes that are higher up in the hierarchy receive larger token quantities for distribution). Therefore, if mixer nodes are recruited for specific levels of the hierarchy, randomization would be restricted to moving the mixer nodes "horizontally" across that level of the hierarchy, with the level having its own $min_x$ value. On the other hand, if mixer nodes are recruited with no restrictions on level, then the mixer nodes can be randomly placed at any location of any of the mixing levels of the hierarchy, and the $min_x$ value for all mixing nodes would be universal.

Having decided on the position of the mixer nodes in the hierarchy at step 412, the initiator (conceptually) constructs the hierarchy, inclusive of the root node and the leaf nodes, in step 414, and communicates to each participating node, $U_i$, the node they are expected to receive tokens from and the nodes they are each expected to transfer tokens to, in step 416.

Commitment Channels in the HTD

Figure 5A:
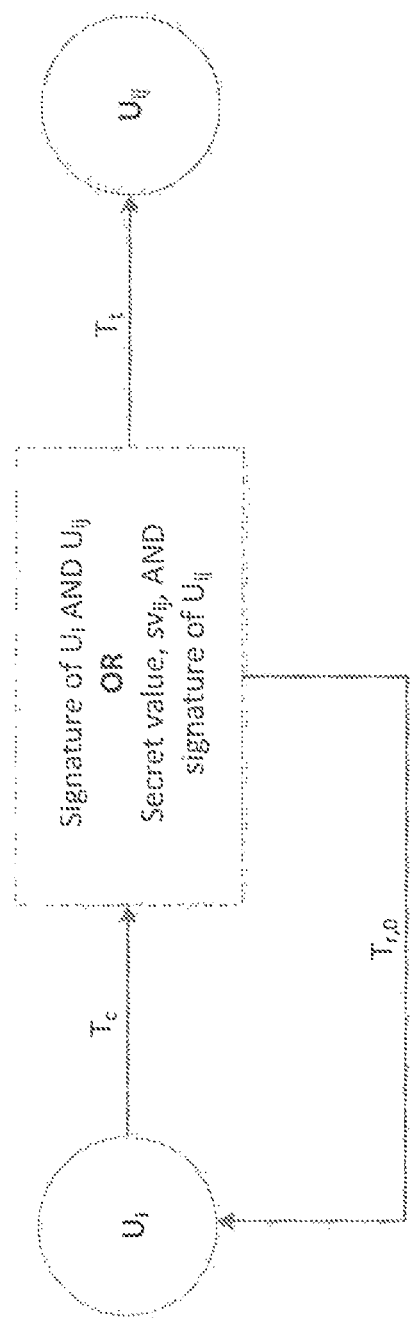
FIG. 5A shows a schematic diagram of a commitment channel utilized in the hierarchical token distribution protocol.

Once the design of the hierarchy has been established and each participating node is aware of their respective transferor (upstream node) and transferees (downstream nodes), a set of one-way commitment channels are set up between every participating node and their transferees. All token transactions between parent-child node pairs in the HTD are accomplished through the use of "commitment channels". In the HTD, a commitment channel is defined by three separate transactions: a commitment transaction, $T_c$, a return transaction, $T_{r,0}$, and a transfer transaction, $T_r$. FIG. 5A shows a schematic diagram illustrating the relationship between the three transactions. Thus, without loss of generality, for each transfer of tokens from a transferor node $U_i$ to a transferee node $U_{ij}$ in the HTD, three blockchain transactions are created:

The commitment transaction, $T_c$, is a 2-of-2 multi-signature P2SH transaction that $U_i$ utilizes to commit a set of tokens, x, for transfer to $U_{ij}$, to be governed by either:
a 2-of-2 multi-signature ($U_i$, $U_{ij}$), or
knowledge of a secret value $sv_{ij}$ and the signature of $U_{ij}$ The return transaction, $T_{r,0}$, returns the previously committed tokens, x back to $U_i$. This transaction becomes eligible for submission to the blockchain after a specific point in time. For the return transaction to be executed successfully, it requires the signatures of users $U_i$ and $U_{ij}$.

The transfer transaction, $T_r$, actually sends the committed tokens x to $U_{ij}$. For this transaction to be executed successfully, it requires the knowledge of a secret value $sv_{ij}$ and the signature of the user $U_{ij}$.

Figure 5B:
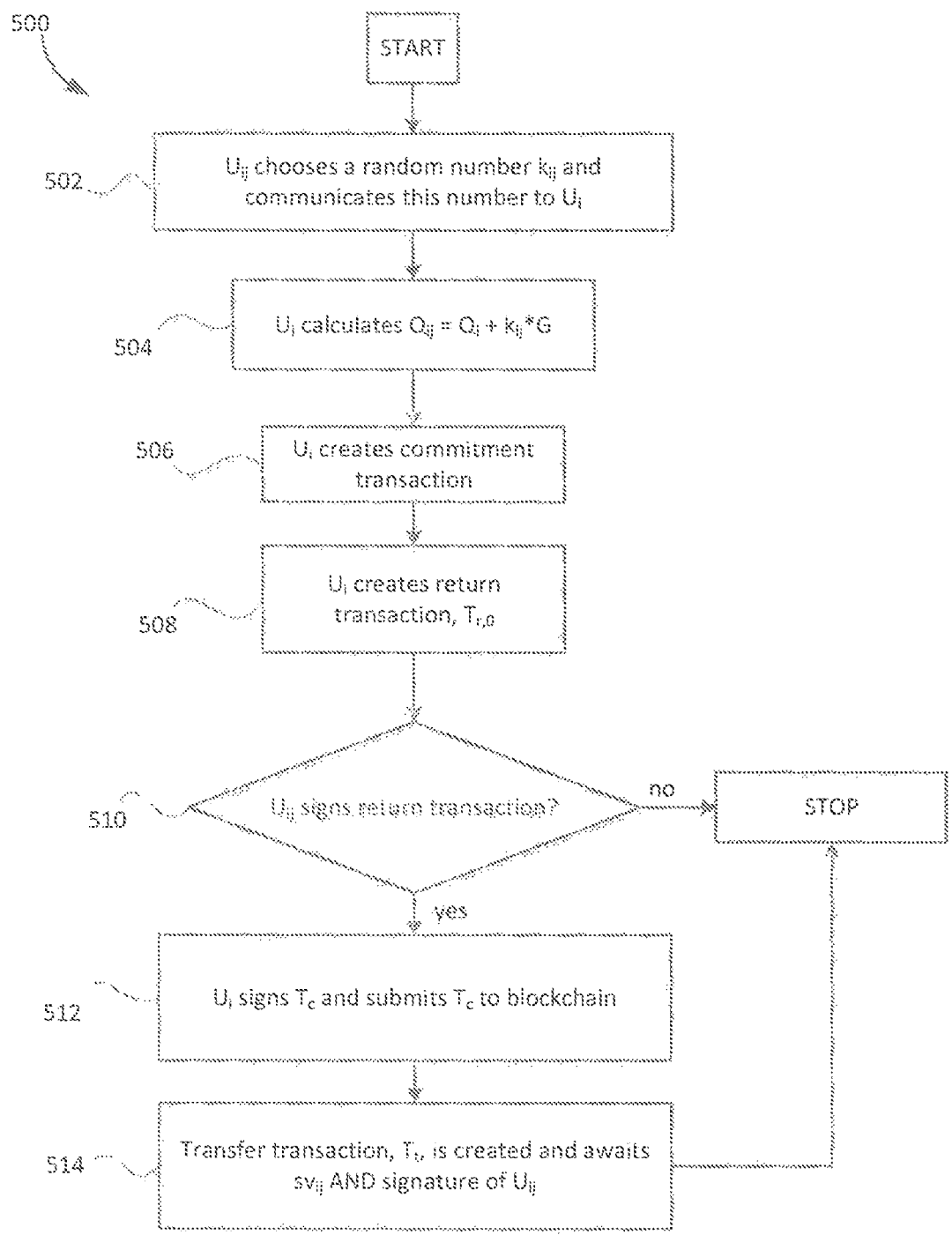
FIG. 5B shows, in flowchart form, an example process for constructing a commitment channel between a node and a downstream node in the hierarchical token distribution protocol.

Each commitment channel that is generated as part of the HTD is "locked" by a secret value, which a transferee must provide in order to receive any transfer of tokens. An example process 500 for constructing a commitment channel, $U_i \rightarrow U_{ij}$, between a transferor node $U_i$ and a transferee node $U_{ij}$ is illustrated in FIG. 5B:

1. Operation 502: Transferee $U_{ij}$ chooses a random number $k_{ij}$. Each commitment channel may utilize a different random number, in order to make it more difficult for external nodes to be able to associate a set of transactions as being elements of the same instance of HTD. In particular, being able to link the different transactions visible in the blockchain to a common instance of HTD can be made more complicated, as the transactions are not all tagged with the same secret.
2. Operation 502: Transferee $U_{ij}$ communicates the value of $k_{ij}$ to $U_i$.
3. Operation 504: Transferor $U_i$ calculates the encrypted version $Q_{ij}$ of secret value $sv_{ij}$, using the relation $$Q_{ij} = Q_i + k_{ij}G = sv_{ij}G$$

4. Operation 506: Transferor $U_i$ utilizes the encrypted value $Q_{ij}$ and creates a commitment transaction, $T_c$, which commits a token quantity x that can only be transferred by either (1) the signatures of both $U_i$ and $U_{ij}$, or (2) $sv_{ij}$ and the signature of $U_{ij}$.
5. Operation 508: Transferor $U_i$ creates a return transaction, $T_{r,0}$, which returns the committed value x to $U_i$. The return transaction contains a parameter, nLockTime, which specifies a point in time at or after which the return transaction becomes eligible for submission to the blockchain. A suggested nLockTime value may be calculated as $$S + \sum_{i=1}^{n_l - level(U_i)} sn_b^i = S + s\left(\frac{n_b(n_b^{n_l - level(U_i)} - 1)}{n_b - 1}\right)$$

where $n_l$ is the number of levels in the hierarchy, $level(U_i)$ is $U_i$'s level in the hierarchy, S is the starting time of the first transfer to a node that is submitted to the blockchain network, and s is a time value, selected by the HTD service, that represents the amount of time that each $U_i$ is given to construct a commitment channel and to retrieve the necessary secret value for the commitment channel that transfers tokens to $U_i$ and submit the transfer transaction, $T_r$, to the blockchain network.

6. Operation 510: Transferee $U_{ij}$ signs the return transaction.
7. Operation 512: Transferor $U_i$ signs the commitment transaction, $T_c$, and submits it to the blockchain.
8. Operation 514: A transfer transaction, $T_r$, is created which transfers the committed tokens x of the commitment transaction to $U_{ij}$. The unlocking script, or <scriptSig>, for the transfer transaction needs to contain a value $sv_{ij}$ if the transfer transaction is to be successfully submitted to the blockchain.

In the HTD, the tokens received via a first commitment channel $U_i \rightarrow U_{ij}$ are divided into several sub-amounts that are in turn transferred via n b second commitment channels, $U_{ij} \rightarrow U_{ijk}$. The splitting of a quantity of tokens at each non-leaf node for transfer to child nodes may be governed by a value allocation scheme for the respective node. For example, the value allocation scheme for a node may indicate a ratio by which a token quantity received at said node may be split (e.g. 50:50, 40:35:25, etc.) between its child nodes. Value allocation schemes may be independently determined for each non-leaf node in a hierarchy, or the same value allocation scheme may be applied for all non-leaf nodes. In some embodiments, value allocation schemes may be utilized to ensure that desired sub-amounts arrive at their respective destination (output) addresses in the HTD hierarchy.

A participating node that provides services as a mixer node in the HTD would want to be assured that it will receive, from its upstream (parent) node, transfer of a quantity of tokens that is at least equal to the sum of the sub-amounts that the node transfers to its children during the distribution process. This is where the use of commitment channels can provide a measure of security for HTD participating nodes, by helping to ensure that transactions of the protocol are completed without enabling a node to cancel or renege on any of the transactions partway through. For every path in the hierarchy that traces a route from the $U_r$ to a leaf node, the commitment channels between parent-child node pairs are created in a specific order. In particular, the commitment channel $U_i \rightarrow U_{ij}$ is created before any commitment channel $U_{ij} \rightarrow U_{ijk}$. That is, the commitment channel for the transaction that transfers tokens to user $U_{ij}$ will be established before any commitment channel for a transaction transferring to $U_{ijk}$ from $U_{ij}$. This ordered sequence allows node $U_{ij}$ to, before risking/making a transfer, ensure that there exists a $T_t$ transaction to $U_{ij}$ that $U_{ij}$ is able to successfully execute if $U_{ij}$ makes a transfer to at least one of its transferees, $U_{ijk}$.

In at least some embodiments, there exists a transaction "cost" associated with one or more of the transfer transactions in the HTD. Moreover, mixer nodes participating in the protocol will likely require receipt of tokens prior to providing their mixing services. For example, for each of at least one of the mixer nodes, a certain amount of tokens may need to be transferred to the mixer node in order to activate the mixer node's services (e.g. to mobilize and/or control the node's resources for mixing tokens). These "costs" can be taken into consideration by the initiator when deciding on the amount of tokens to be introduced into the HTD in view of the desired/expected token output at the leaf nodes.

As an example, assuming that the transfer of tokens to mixer node $U_{ij}$ can be seen as a percentage of the tokens that the node received, and is inclusive of the transaction costs $U_{ij}$ has to transfer to $U_{ij}$'s transferees, the total mixer node costs, $C_{mix}$, for the set of transactions in the HTD can be represented as $$C_{mix} = sx\left[1 + \sum_{i=1}^{n_l-2}(1-s)^i\right] = x - x(1-s)^{n_l-1},$$

where s is the rate/percentage of the tokens transferred taken from the mixer node, x is the amount 'deposited' at $U_0$, and $n_l$ is the number of levels in hierarchy. Mixer node transfers begin at level 2 and end at the level before the leaves, hence the number of levels involved are $n_m = n_l - 2$. The function $C_{mix}(s, x)$ is independent of the ratio in which token transfers are split.

Secret Values of Commitment Channels

Each commitment channel $U_i \rightarrow U_{ij}$ requires that the transferee $U_{ij}$ provides a secret value $sv_{ij}$ to receive tokens via the commitment channel. In the HTD protocol, the initiator exercises control over all of the transfer processes (between parent-child pairs) that are implemented as part of the token distribution process. The secret values $sv_{ij}$ serve to "lock" the commitment channels, preventing withdrawal of token by any of the participating nodes, until the initiator is satisfied that the commitment channels for transferring tokens to the leaf nodes have been created. The secret value for a commitment channel $U_i \rightarrow U_{ij}$ located anywhere along the hierarchy of the HTD may be obtained according to the following process:

1. $U_{ij}$ communicates its random number $k_{ij}$ (which is selected by $U_{ij}$ during initialization of the HTD, as shown in operation 408 of process 400 in FIG. 4) to $U_i$, and $U_i$ communicates an encrypted version of its secret key, $Q_i$, to $U_{ij}$, where $Q_i = sv_i G$
2. The secret value for the commitment channel $U_i \rightarrow U_{ij}$ is to be $$sv_{ij} = sv_i + k_{ij}$$

for which its encrypted value is $Q_{ij} = Q_i + k_{ij}G$. The secret values, $sv_{ij}$, are iteratively defined, beginning with $sv_0 = k_s$.

3. This secret value $sv_{ij} = k_s + k_a + k_b + \ldots + k_{ij}$, where $k_s$, $k_a$, $k_b$, ..., $k_i$ are the random numbers chosen by participating nodes of the commitment channels preceding the commitment channel $U_i \rightarrow U_{ij}$ in the same path. This can be seen from the following calculation:

$$Q_{ij} = Q_i + k_{ij}G = (k_s G + k_a G + k_b G + \ldots + k_i G) + k_{ij}G = (k_s + k_a + k_b + \ldots + k_{ij})G$$

At this point, node $U_{ij}$ does not know the secret value for the commitment channel, as the initiator keeps $k_s$ private and unknown to any other nodes in the HTD. More generally, none of the transfer transactions of the HTD can be started without the initiator revealing the secret value, $k_s$.

Executing the Transactions of the HTD

Figure 6:
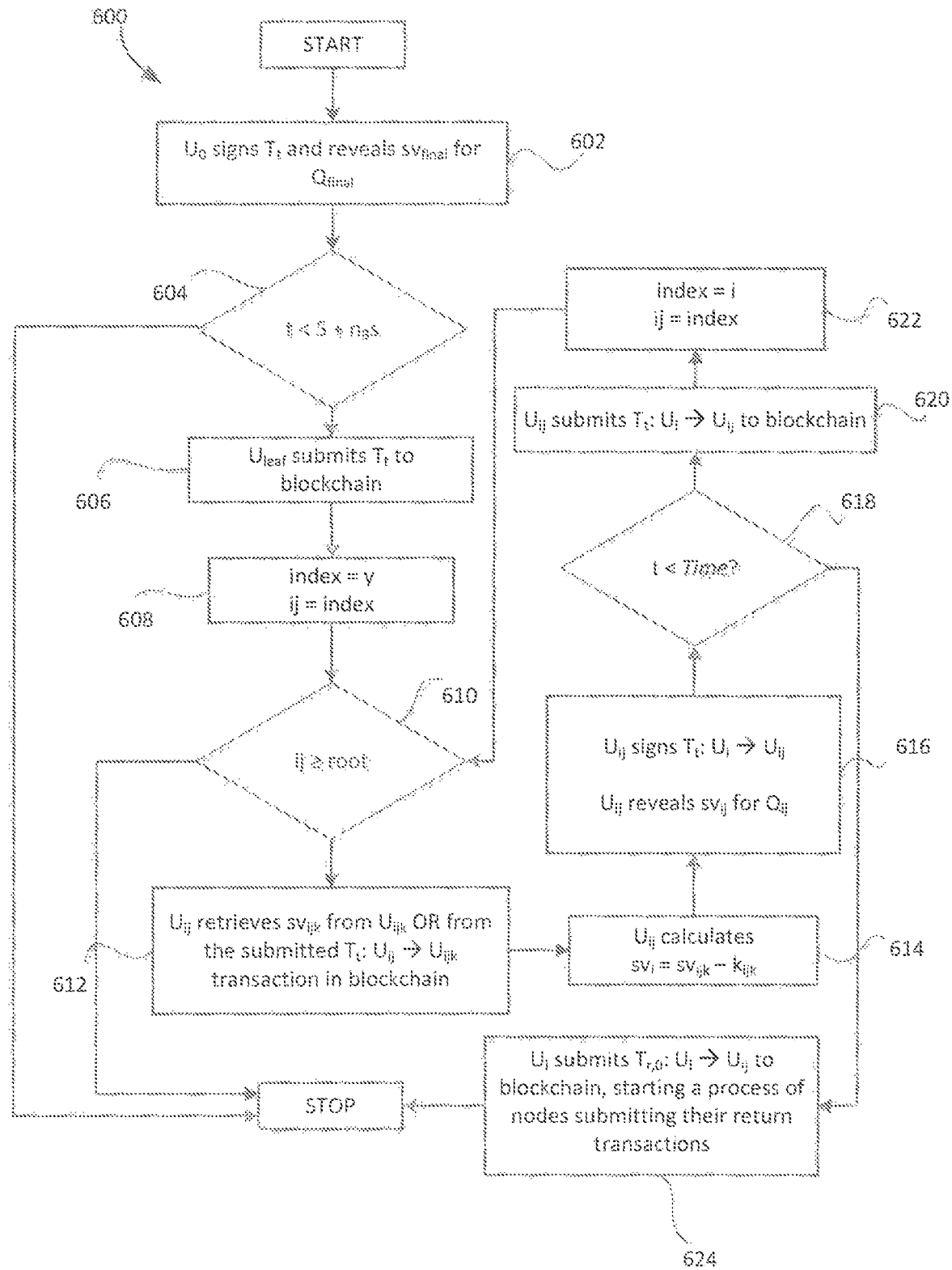
FIG. 6 shows, in flowchart form, an example process of submitting token transfers along a path in the hierarchy in the hierarchical token distribution protocol.

Reference is now made to FIG. 6, which shows an example process 600 for executing the transfer transactions of the commitment channels created by participating nodes of the HTD. As noted above, the initiator $U_0$ of the distribution receives the random number values $k_i$ from all nodes of the hierarchy and is thus in possession of all of the secret values. (Recall that the secret values for commitment channels used in the HTD are defined by $sv_{ij} = k_s + k_a + k_b + \ldots + k_{ij}$.) Provided that all commitment channels are created at or before time S, the initiator sets off a sequential revealing of secret values for all of the commitment channels of the HTD. In particular, at step 602, the initiator releases the "final" secret values, $sv_{final}$, given by $$sv_{final} = k_s + k_a + k_b + \ldots + k_z + k_{leaf}$$

for each of the unique paths (of consecutive commitment channels) in the hierarchy leading to their corresponding leaf nodes. The initiator can do this either by communicating the $sv_{final}$ values directly to the corresponding $U_z$ node (i.e. the parent of $U_{leaf}$ in the path), or it can submit the transfer transaction, $T_t: U_z \rightarrow U_{leaf}$ (since the initiator also owns the leaf nodes), thereby allowing $U_z$ to retrieve the secret value $sv_{final}$ from the blockchain. Upon checking, in step 604, that the nLockTime for the commitment channels for transferring tokens to the leaf nodes has not passed, the initiator submits $T_t: U_z \rightarrow U_{leaf}$ to the blockchain, at step 604.

Once $U_z$ obtains the $sv_{final}$ value at step 606, it can simply subtract $k_{leaf}$ (which is previously communicated by $U_{leaf}$ to its parent, $U_z$) from $sv_{final}$ to determine $sv_z$, the secret value needed for $U_z$ to receive tokens from its parent node, at step 608. More generally, each node $U_{ijk}$ may directly communicate the value $sv_{ijk}$ to its transferor $U_{ij}$, or if $U_{ijk}$ fails to do so, node $U_{ij}$ attempts to retrieve the value $sv_{ijk}$ in the blockchain ledger before the nLockTime value of the transfer transaction which transfers tokens to $U_{ij}$ expires.

In this way, the secret values $sv_{ij}$ are sequentially revealed (in steps 608 through to 622, while the current time is less than $$nLockTime = S + \sum_{i=1}^{n_l-level(U_i)} sn_b^i = S + s\left(\frac{n_b\left(n_b^{n_l-level(U_i)} - 1\right)}{n_b - 1}\right)$$

by moving up the paths in the hierarchy and using the relation $sv_{ij}=sv_{ijk}-k_{ijk}$. The $sv_{ij}$ value allows node $U_{ij}$ to receive tokens via $T_r:U_i \to U_{ij}$. An important corollary of this sequential reveal procedure is that the secret value for a specific commitment channel can be determined using any of the paths for which the commitment channel is shared in the hierarchy of HTD. Each commitment channel has only one secret value (contained in the unlocking script <scriptSig> for the transfer transaction). Since an "edge" (i.e., a commitment channel between a parent-child node pair) in the tree structure representing the hierarchy of HTD is shared by all paths that contain said "edge," the calculation of the secret value associated with the commitment channel corresponding to said "edge" may be performed using any of the paths sharing that commitment channel. This also implies that node $U_{ij}$ can receive its own tokens from $U_i$ before one or more of its $n_b$ child nodes receives their tokens from $U_{ij}$. In particular, $U_{ij}$ can receive its due total tokens from $U_i$ even if only one transferee withdraws tokens from $U_{ij}$. Each node $U_{ij}$ is therefore guaranteed the ability to receive tokens if $U_{ij}$ makes a transfer of tokens to at least one of its child nodes, $U_{ijk}$. When all of the transfer transactions of the HTD are completed, the original set of tokens is distributed to the input addresses of the leaf nodes.

Returning Tokens

The submission of return transactions to the blockchain is restricted by the nLockTime value, which is a period of time during which return transactions are not to be accepted by the blockchain. In the HTD, a suggested value for nLockTime is given by, $$nLockTime = S + \sum_{i=1}^{n_l-level(U_i)} sn_b^i = S + s\left(\frac{n_b\left(n_b^{n_l-level(U_i)} - 1\right)}{n_b - 1}\right).$$

If a transferee $U_{ijk}$ fails to reveal the secret value $sv_{ijk}$ before the expiry of nLockTime for the return transaction, $T_{r,0}:U_{ij} \to U_{ijk}$, the transferor $U_{ij}$ may submit the return transaction to the blockchain. If this return transaction is successfully submitted, the transfer transaction $T_r:U_{ij} \to U_{ijk}$ for the commitment channel between transferor $U_{ij}$ and transferee $U_{ijk}$ can never be executed. If at least one return transaction is submitted to the blockchain, the return submission processes are repeated, upwards through the levels of the hierarchy, up to and including the initiator $U_0$.

Anonymity Considerations

Figure 7:
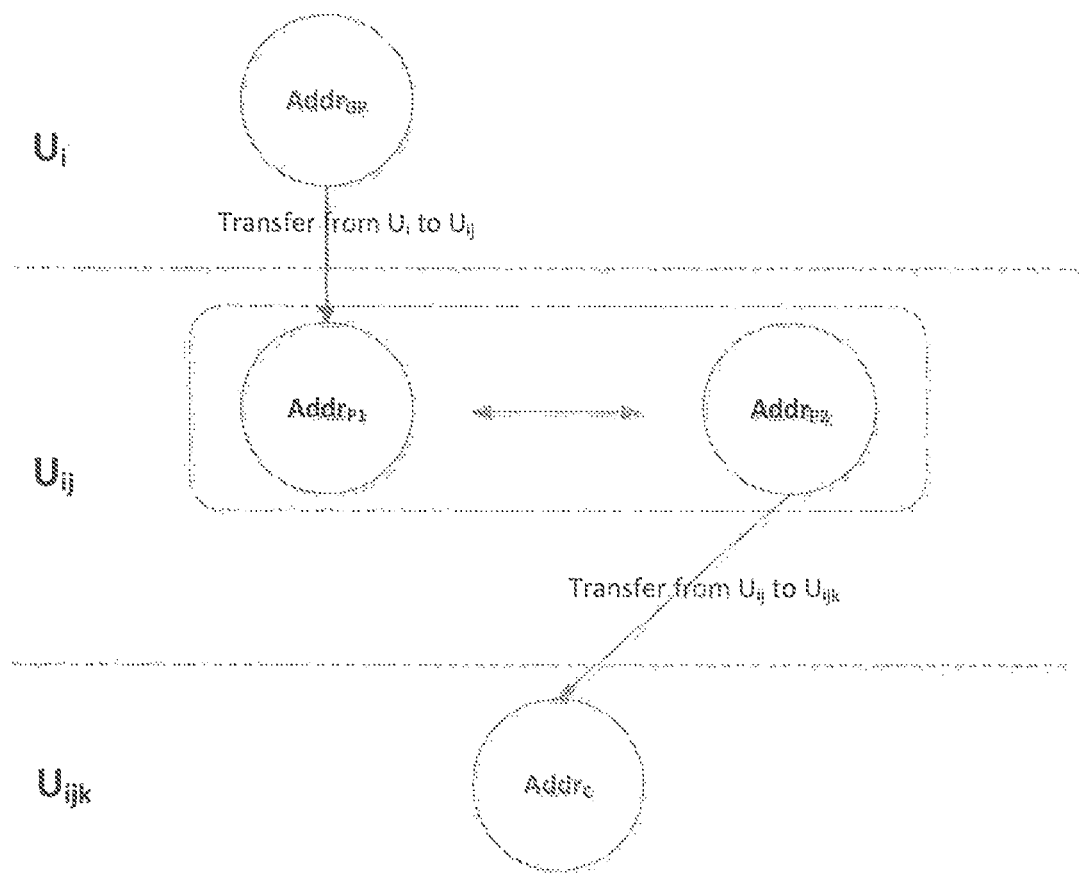
FIG. 7 shows a schematic diagram illustrating the use, by a mixer node, of different blockchain addresses for receiving token transfer and transferring tokens, respectively, in the hierarchical token distribution protocol.

As explained above, mixer nodes may serve the function of mixing tokens during distribution of tokens through the multi-level hierarchy of the HTD. That is, the mixer nodes may render tracing the flow of tokens more difficult. One way in which this can be done is by ensuring that a mixer node has pre-existing addresses that are different from the address where tokens are received (from the parent node) and from which the mixer node can pass on the tokens to their child nodes. An example of this scenario is illustrated in FIG. 7, where $U_{ij}$ has an address (Addr_P1) where it receives tokens from $U_i$ and a separate address (Addr_P2) where sufficient quantity of tokens to be passed on to the child node, $U_{ijk}$, are already available. Using these separate addresses of a mixer node to delink the receipt of a token amount at the node and the transfer of sub-amounts from the node may potentially yield anonymization benefits in the HTD. In at least some embodiments, the HTD protocol may be designed to require a minimum number of mixer nodes that have different pay-receive addresses. For example, an initiator and/or administrator of the HTD may enforce that at least one mixer node in each path of the hierarchy abide by the different transfer-receive addresses stipulation.

Figure 8:
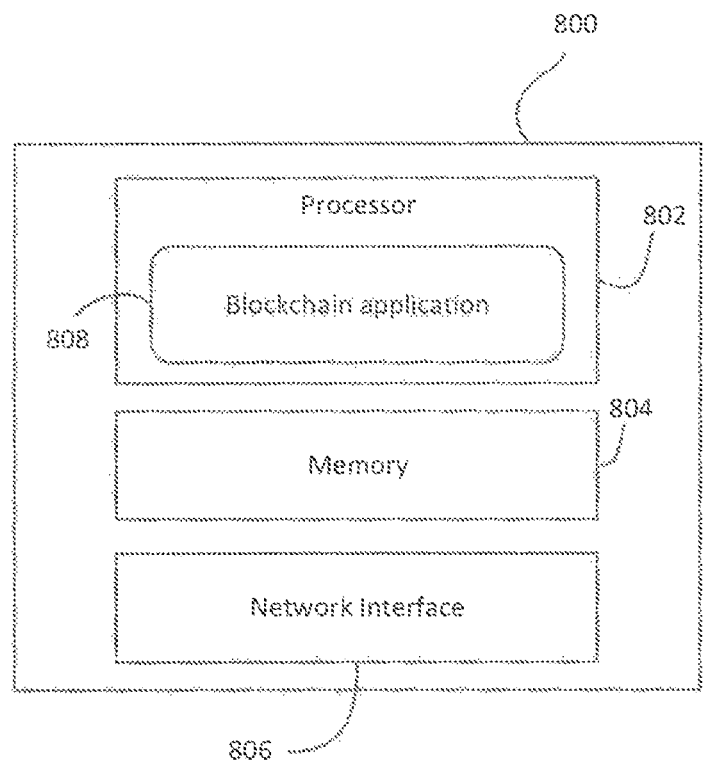
FIG. 8 shows a block diagram of a simplified participating node.

Reference will now be made to FIG. 8, which shows, in block diagram form, a simplified example of a participating node 800. The node 800 may be an input node or an output node. The node 800 includes a processor 802, which may include one or more microprocessors, application specific integrated chips (ASICs), microcontrollers, or similar computer processing devices. The node 800 further includes memory 804, which may include persistent and non-persistent memory, to store values, variables, and in some instances processor-executable program instructions, and a network interface 806 to provide network connectivity over wired or wireless networks.

The node 800 includes a processor-executable blockchain application 808 containing processor-executable instructions that, when executed, cause the processor 802 to carry out one or more of the functions or operations described herein.

It will be understood that the devices and processes described herein and any module, routine, process, thread, application, or other software component implementing the described method/process for configuring the participating node may be realized using standard computer programming techniques and languages. The present application is not limited to particular processors, computer languages, computer programming conventions, data structures, and other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method for generating a unidirectional commitment channel from a first node to a second node, the method implemented by a processing resource, the computer-implemented method comprising:

generating a commitment transaction representing a commitment component in which a specified set of tokens is sent or committed for transfer from the first node to the second node;

generating a return transaction which returns all tokens from the second node to the first node;

signing the return transaction and, based on the signing of the return transaction, signing the commitment transaction; and creating one or more further return transactions to reflect the transfer of tokens being made off a blockchain.

2. The computer-implemented method according to claim 1, wherein the commitment transaction is a pay-to-script hash transaction.

3. The computer-implemented method according to claim 1, wherein the return transaction is only executable after a specific point in time.

4. The computer-implemented method according to claim 1, wherein the one or more further return transactions reflect a net transfer of tokens that the first node is required to make to the second node.

5. The computer-implemented method according to claim 1, wherein the method is implemented by both the first node and the second node.

6. The computer-implemented method according to claim 1, wherein the first node is a transferor node and the second node is a transferee node.

7. A method according to claim 1, wherein the unidirectional commitment channel is suitable for use where a party A associated with the first node desires to pay party B associated with the second node via multiple transfers over a period of time.

8. The computer-implemented method according to claim 1, wherein the return transaction allows the committed tokens to be returned to the first node if the second node is unable to satisfy a stated criteria for the commitment transaction.

9. The computer-implemented method according to claim 1, wherein:
the first node provides a secret value to the second node or vice versa; and
the secret value locks the unidirectional commitment channel.

10. The computer-implemented method according to claim 9, wherein the secret value is generated in accordance with the method comprising:
a random number is transferred between the first and second nodes; and
an encrypted version of a secret key is transferred between the first and second nodes.

11. A computing device comprising:
a processor;
memory;
a network interface; and
a blockchain application containing computer-executable instructions that, when executed by the processor, cause the processor to carry out the computer-implemented method of claim 1.

12. A non-transitory processor-readable medium storing processor-executable instructions, wherein the processor-executable instructions, when executed by a processor in one of the first or second nodes, cause the processor to carry out the computer-implemented method claimed in claim 1.

* * * * *